(12) United States Patent
Keely et al.

(10) Patent No.: US 7,810,042 B2
(45) Date of Patent: *Oct. 5, 2010

(54) PAGE BAR CONTROL

(75) Inventors: Leroy B. Keely, Portola Valley, CA (US); David Switzer, Redmond, WA (US); Shawna Swanson, Issaquah, WA (US); Kevin P. Paulson, Redmond, WA (US); Tamara Stephas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 239 days.

This patent is subject to a terminal disclaimer.

(21) Appl. No.: 11/464,979

(22) Filed: Aug. 16, 2006

(65) Prior Publication Data

US 2006/0294473 A1    Dec. 28, 2006

Related U.S. Application Data

(62) Division of application No. 10/285,673, filed on Nov. 1, 2002, now Pat. No. 7,100,119.

(51) Int. Cl.
    *G06F 3/048* (2006.01)
(52) U.S. Cl. .................................... 715/776; 715/777
(58) Field of Classification Search ................. 715/776, 715/777, 779, 781, 817, 818, 819, 820, 854, 715/855
    See application file for complete search history.

(56) References Cited

U.S. PATENT DOCUMENTS

| | | | |
|---|---|---|---|
| 5,283,864 A | | 2/1994 | Knowlton |
| 5,418,549 A | * | 5/1995 | Anderson et al. ........... 715/786 |
| 5,463,724 A | | 10/1995 | Anderson et al. |
| 5,463,725 A | | 10/1995 | Henckel et al. |
| 5,504,850 A | * | 4/1996 | Aoyama ..................... 715/860 |
| 5,757,370 A | * | 5/1998 | Amro et al. ................. 715/787 |

(Continued)

OTHER PUBLICATIONS

L. Holmquist et al., "Flip Zooming: A Practical Focus+Context Approach to Visualizing Large Data Sets," Design of Computing Systems: Cognitive Considerations: Proceedings of the Seventh International Conference on Human-Computer Interaction, (HCI International '97), San Francisco, CA, Aug. 24-29, 1997, vol. 2, pp. 763-766.

(Continued)

*Primary Examiner*—Dennis-Doon Chow
*Assistant Examiner*—Rashawn Tillery
(74) *Attorney, Agent, or Firm*—Shook, Hardy & Bacon L.L.P.

(57) ABSTRACT

Graphical user interfaces for computer display devices include a page bar control element that allows a user to easily and quickly navigate among the pages of a multiple page electronic document and/or among the pages of a plurality of electronic documents. In some examples, the page bar control element displayed on the computer system provides a visual representation of a multiple pages of the document(s), wherein the visual representation includes several tabs or markers, each marker representing one or more pages of the document(s). In some examples, the markers are rendered in colors that enable quick identification of the current page and/or the page being viewed as well as pages viewed in a riffling action. The page bar control element also may include a visual "flag" that helps users quickly locate text that they have previously flagged or that the system has automatically flagged for them.

15 Claims, 11 Drawing Sheets

U.S. PATENT DOCUMENTS

| | | | |
|---|---|---|---|
| 5,900,876 | A | 5/1999 | Yagita et al. |
| 6,028,603 | A | 2/2000 | Wang et al. |
| 6,243,071 | B1* | 6/2001 | Shwarts et al. ............... 715/823 |
| 6,320,591 | B1 | 11/2001 | Griencewic |
| 6,337,698 | B1* | 1/2002 | Keely et al. ................. 715/823 |
| 6,369,811 | B1 | 4/2002 | Graham et al. |
| 6,486,895 | B1 | 11/2002 | Robertson et al. |
| 6,590,595 | B1* | 7/2003 | Wagner et al. ............... 715/784 |
| 6,613,100 | B2* | 9/2003 | Miller ......................... 715/273 |
| 6,725,427 | B2* | 4/2004 | Freeman et al. ............. 715/273 |
| 6,741,268 | B1 | 5/2004 | Hayakawa |
| 6,992,687 | B1 | 1/2006 | Baird et al. |
| 7,100,119 | B2* | 8/2006 | Keely et al. ................. 715/776 |
| 7,165,227 | B2* | 1/2007 | Ubillos ........................ 715/784 |
| 7,266,768 | B2* | 9/2007 | Ferlitsch et al. ............. 715/273 |
| 7,574,669 | B1 | 8/2009 | Braun et al. |
| 2002/0038322 | A1 | 3/2002 | Iijima |
| 2002/0073122 | A1* | 6/2002 | Iwata et al. .................. 707/525 |
| 2002/0080180 | A1* | 6/2002 | Mander et al. ............... 345/769 |
| 2002/0087602 | A1 | 7/2002 | Masuda et al. |
| 2004/0172588 | A1* | 9/2004 | Mattaway ................ 715/500.1 |
| 2004/0201613 | A1* | 10/2004 | Simpson et al. ............. 345/738 |
| 2004/0205638 | A1 | 10/2004 | Thomas et al. |
| 2004/0216057 | A1 | 10/2004 | Wyle et al. |
| 2005/0034056 | A1 | 2/2005 | Rubin et al. |

OTHER PUBLICATIONS

R. Harger, "Teaching in a Computer Classroom with a Hyperlinked, Interactive Book," IEEE Transactions on Education, vol. 39, No. 3, Aug. 1996, pp. 327-335.

R. Harger, "Introducing DSP with an Electronic Book in a Computer Classroom," IEEE Transactions on Education, vol. 39, No. 2, May 1996, pp. 173-179.

D. Beard, "Navigational Techniques to Improve the Display of Large Two-Dimensional Spaces," Behavior & Information Technology, 1990, vol. 9, No. 6, pp. 451-466.

S. Björk, et al., "WEST: A Web Browser for Small Terminals," UIST '99: Proceedings of the 12th Annual ACM Symposium on User Interface Software and Technology, Asheville, NC, Nov. 7-10, 1999, pp. 187-196.

A. Ginsburg, et al., "A Viewer for PostScript Documents," UIST '96: Proceedings of the ACM Symposium on User Interface Software and Technology, Seattle, WA, Nov. 6-8, 1996, pp. 31-32.

PowerPoint® Screenshots, undated.

Visio® Screenshots, undated.

Adobe Acrobat® Screenshots, undated.

OA dated Dec. 26, 2008, for U.S. Appl. No. 11/464,960, 14 pages.

OA dated Jun. 5, 2009, for U.S. Appl. No. 11/464,960.

Non-Final Office Action dated Jan. 7, 2010 for U.S. Appl. No. 11/464,960.

OA dated Jun. 20, 2008, for U.S. Appl. No. 11/464,960, 23 pages.

* cited by examiner

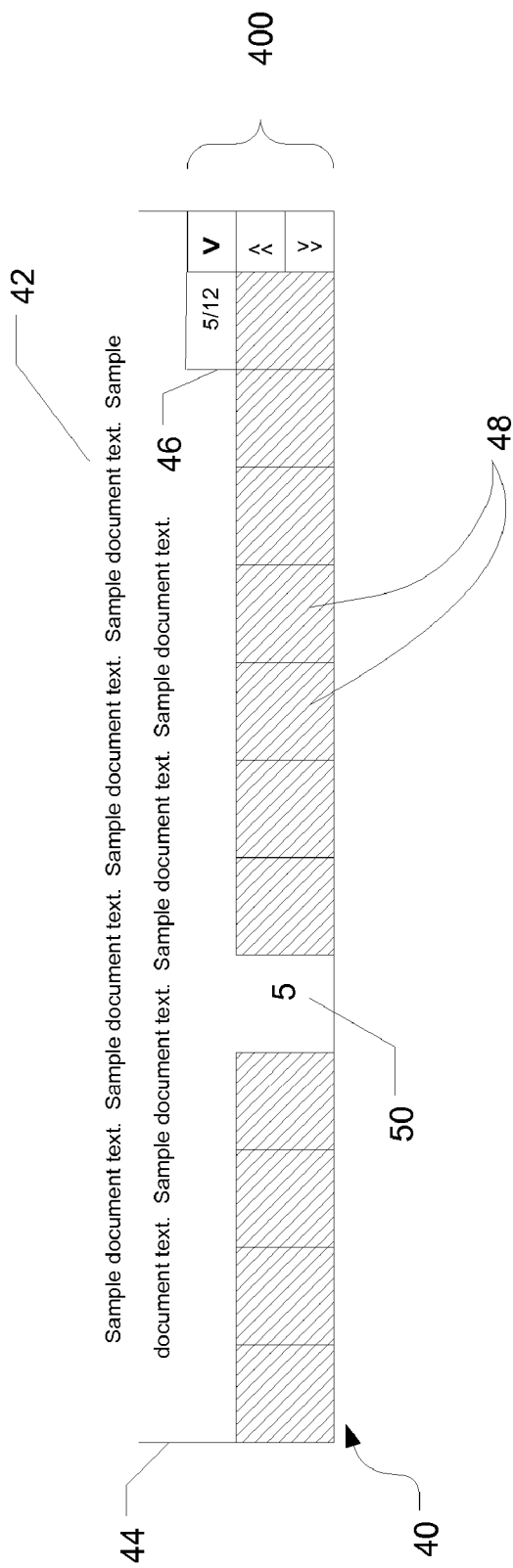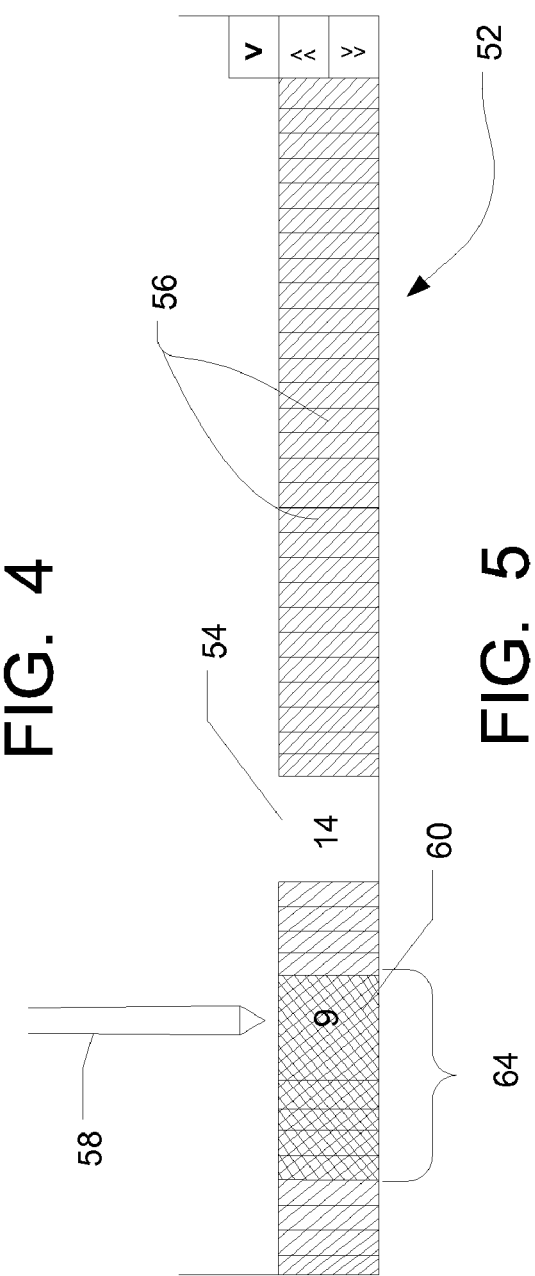
FIG. 4
FIG. 5

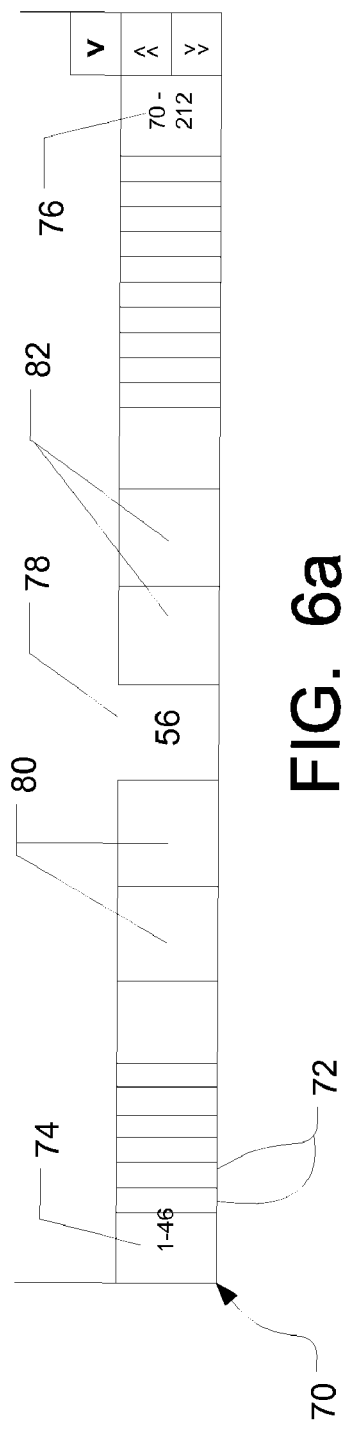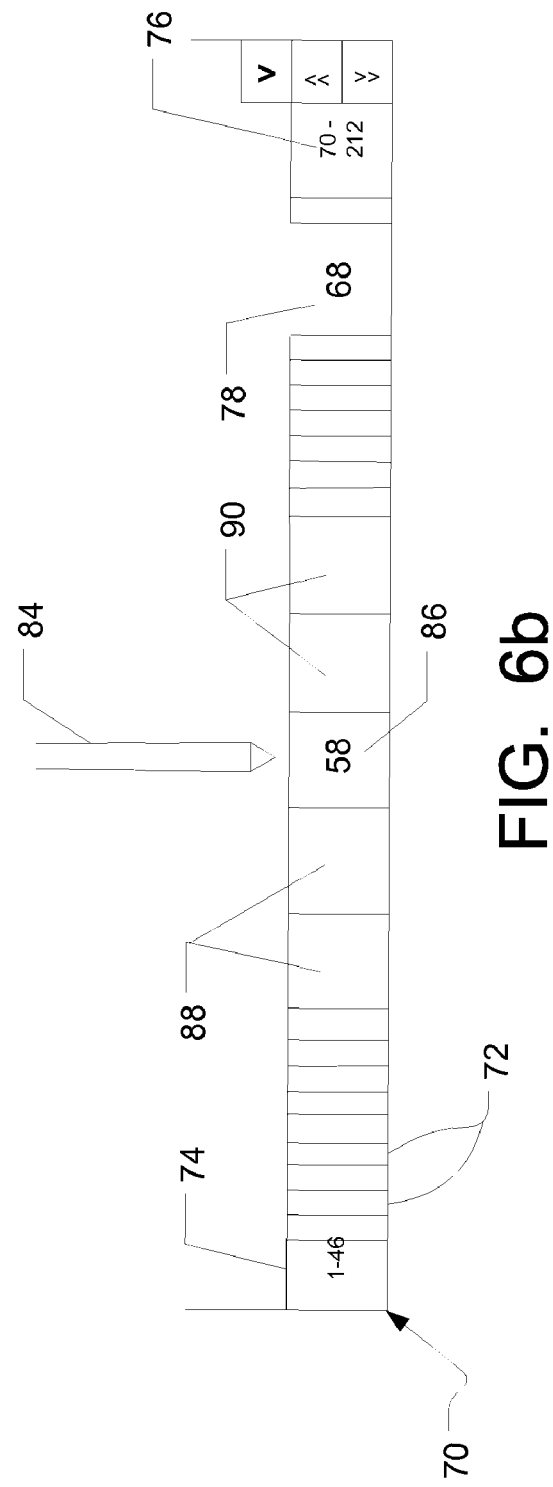

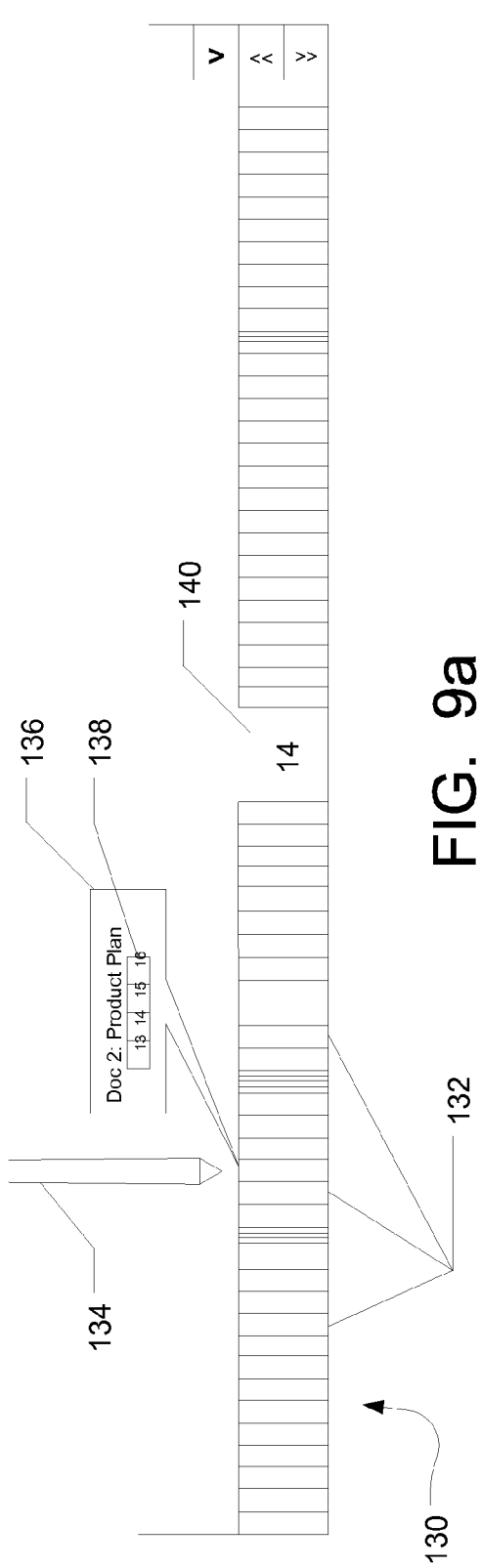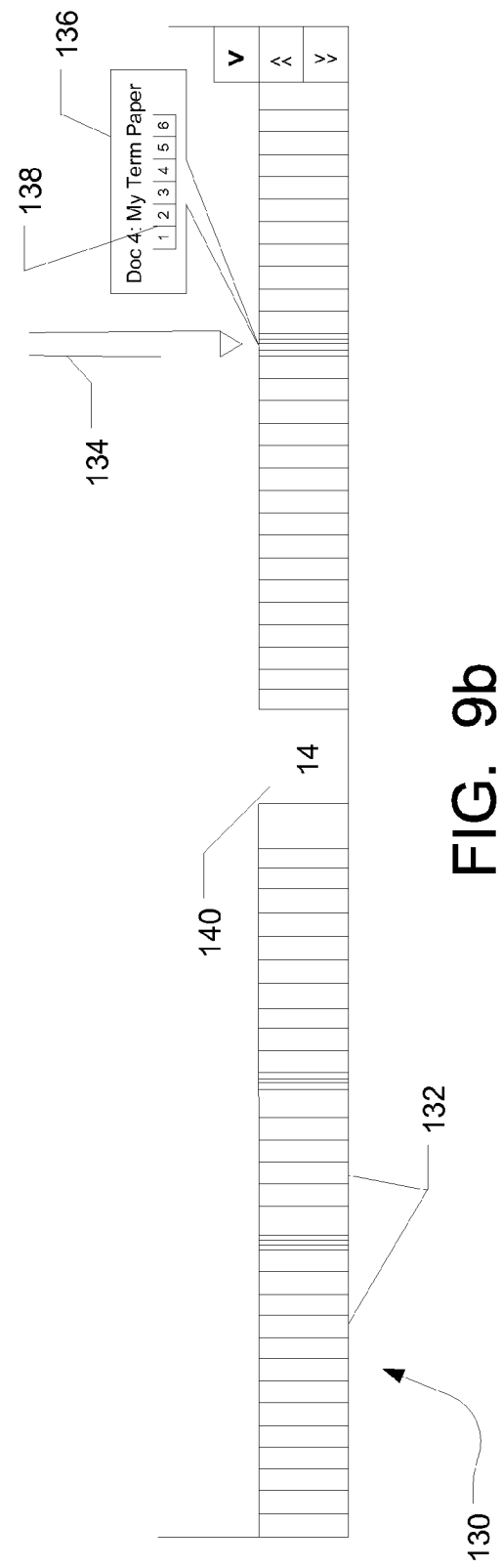

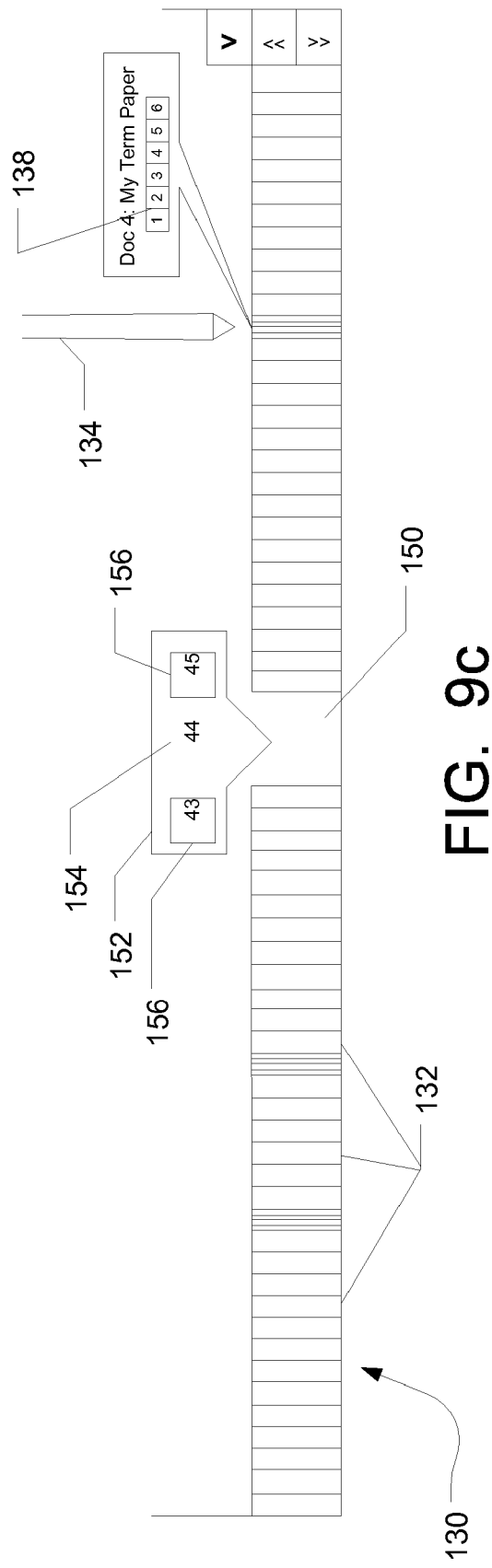

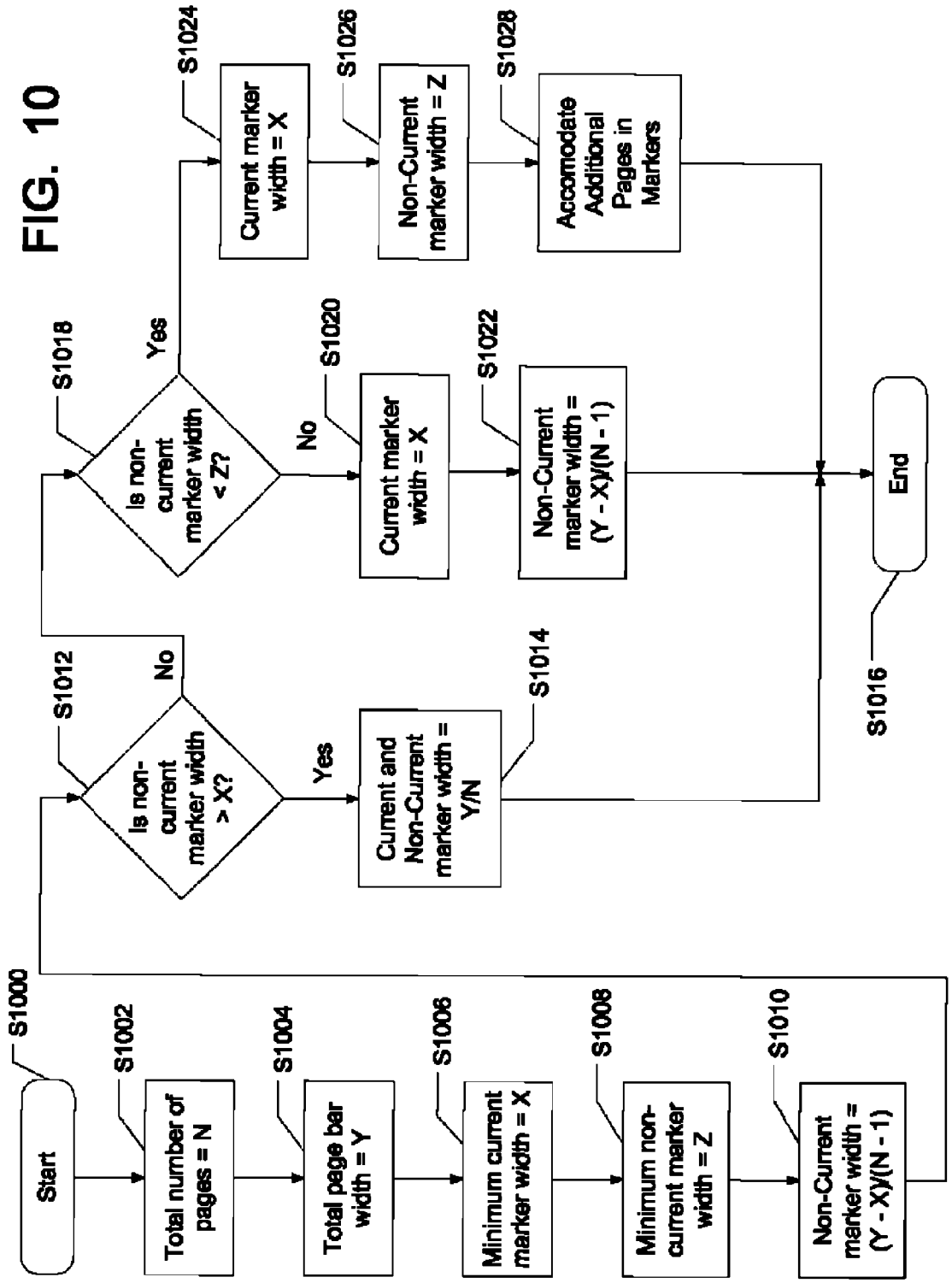

PAGE BAR CONTROL

CROSS REFERENCE TO RELATED APPLICATION

This application is a divisional of prior U.S. application Ser. No. 10/285,673, filed Nov. 1, 2002, the entire contents of which are incorporated herein by reference.

FIELD OF THE INVENTION

The present invention relates generally to graphical user interfaces. More specifically, the present invention relates to graphical user interfaces that include a page bar control element that allows for easy and quick navigation among multiple pages, multiple documents, and/or multiple application programs on a computer system.

BACKGROUND OF THE INVENTION

Originally, computing systems were extremely expensive and bulky, thereby limiting their impact on our daily lives. Advancements in technology, however, have progressively and dramatically reduced the cost and size of computing systems while also greatly increasing the speed and computing power of the systems. Increasingly, more and more aspects of our lives have come to include some computer element within it. Indeed, computing systems have revolutionized modern life.

To take advantage of benefits potentially available through use of computing systems, computer users must be able to interact with their computers, to input the necessary information and/or data and to receive the desired output from the computer. In recent years, great advances also have been made in providing a friendly interface for communication between a user and the computing system. Graphical user interfaces ("GUIs"), like those used in connection with computer programs operating on a WINDOWS® based computer operating system (available from Microsoft Corporation of Redmond, Wash.), have become a popular choice for computer users. In such GUIs, a computer user may easily input and manipulate information in a computing system using a keyboard and/or a mouse-type input device (including trackballs, roller balls, and other similar input devices).

Other technological advances have further expanded the manner in which computer users interact with their computing systems. Recently, stylus-based computing systems have become popular in which users interact with their computing systems using a pen or pencil shaped "stylus" to input and/or manipulate information. Examples of such stylus-based computing systems include personal digital assistants ("PDAs") and tablet personal computing systems ("tablet PCs").

Because of the great advances in technology, computing systems of today typically enable users to open and interact with numerous electronic documents and/or application programs at any given time, and users expect to have this type of flexibility when using computing systems. For example, users expect to be able to rapidly switch between one document and another, or even rapidly switch between documents open in one application program to documents existing in another. Additionally, users typically will want to move data and information between different documents, even documents existing in different application programs.

Because of the numerous programs and/or documents that can be open and available to a computer user at any given time, it can become easy for the user to forget which programs and/or documents have been opened and are available for use. Thus, users need a way of quickly identifying the documents and/or application programs open on their computer systems at any given time. Moreover, because of the numerous documents and/or applications that may be open at a given time, a user needs to be able to quickly, easily, and accurately navigate through the open applications and/or documents and to quickly locate the specific portion(s) of interest to the user. While conventional scroll bars provide some navigability, their usefulness is rather limited, particularly when one seeks to quickly find a desired page of a lengthy document.

Additionally, hard copy paper documents, in some ways, provide information to readers based simply on the size of the document. For example, when handling a lengthy document, the reader can get a sense of the overall length of the document and/or his position within the document, simply by look and feel. Additionally, readers can quickly navigate around in a paper document by flipping or riffling through the pages, particularly when quickly looking for previously highlighted or noted portions of the document. This concrete sense of position and fast and efficient movement between pages (e.g., through a riffling action) have long been considered advantages of paper documents over their electronic counterparts.

Aspects of the present invention address one or more of the problems identified above.

SUMMARY OF THE INVENTION

Aspects of the present invention relate to graphical user interfaces that include a page bar control element that allows a user to easily and quickly navigate among the pages of a multiple page electronic document and/or among the pages of a plurality of electronic documents. In some examples according to the invention, the page bar control element displayed on the computer system provides a visual representation of a plurality of pages of the document, wherein the visual representation includes a plurality of markers, each marker representing one or more pages of the document(s). In some examples, the markers are rendered with backgrounds, e.g., colors and/or patterns that enable quick and easy identification of the current page (e.g., the "selected" page) and/or the page being viewed (e.g., the "hover" page). In still other examples of the invention, the user can quickly and easily view the content of various pages in the document by moving an input device along the page bar control element (e.g., using a "hover" action).

BRIEF DESCRIPTION OF THE DRAWINGS

The above and other objects, features, and advantages of the present invention will be readily apparent and fully understood from the following detailed description, taken in connection with the appended drawings, which include:

FIGS. 4 through 9c, which illustrate various examples and features present on some examples of page bar control elements in accordance with the invention;

FIG. 10, which illustrates a flow diagram describing a procedure for determining marker width in accordance with some examples of the invention.

DETAILED DESCRIPTION

Figure 1:
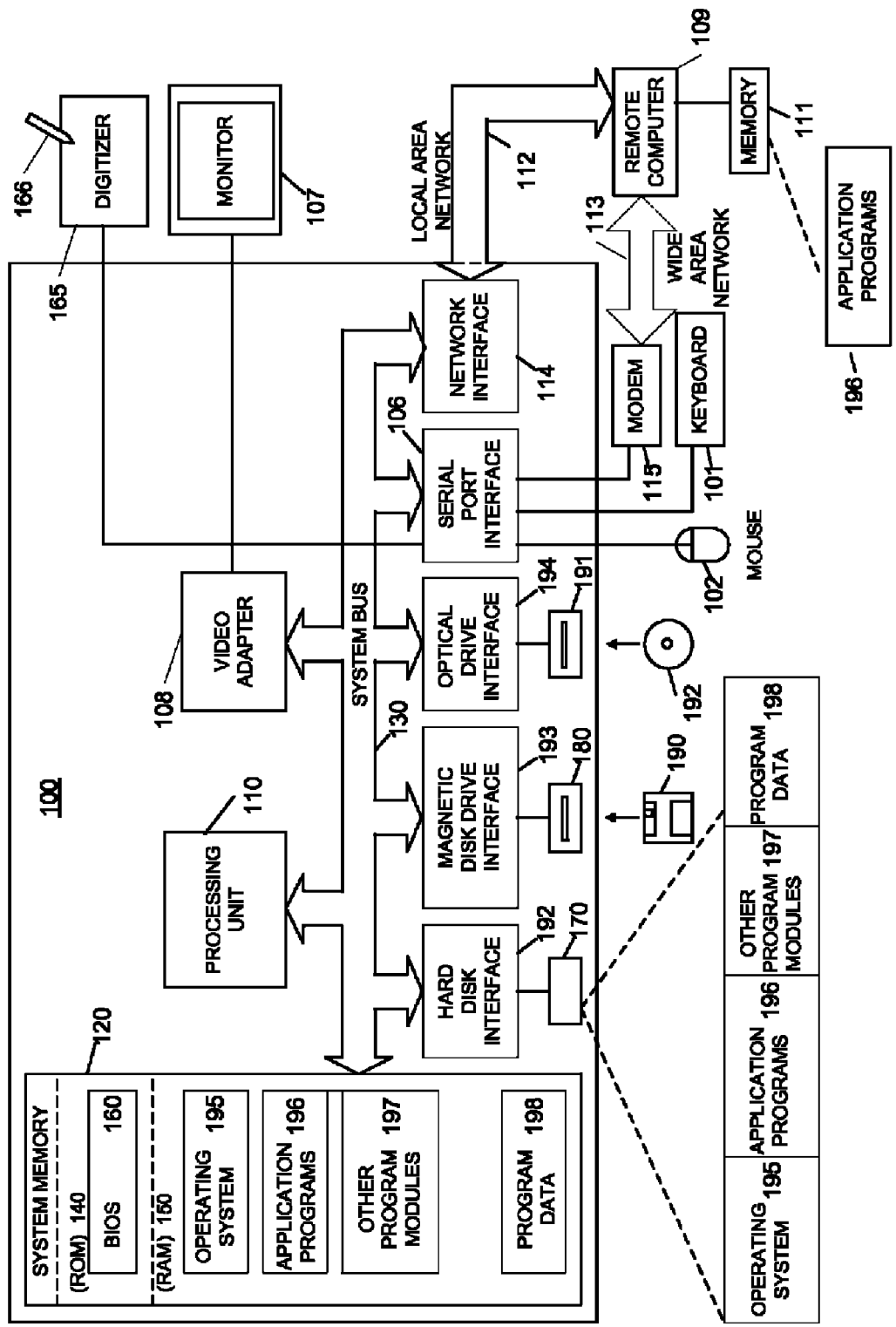
FIG. 1, which illustrates a schematic diagram of a conventional general-purpose digital computing environment in which one or more examples of the present invention may be implemented.

The following description is divided into sub-sections to assist the reader. The sub-sections include: Terms, Example Hardware, The Page Bar Control, and Conclusion.

I. Terms

Render—The process of determining how graphics (including electronic text and/or ink) are to be displayed, whether on a screen or printed.

User input device—Any device through which a user may interact with a graphical user interface. Such input devices include, for example, a keyboard, a stylus, a mouse, a trackball, or the like. Additionally, a user's finger could be used as a user input device, for example, on a touch-sensitive or proximity-sensitive display. Consequently, the term "user input device", as used herein, is intended to have a broad definition and encompasses many variations on well-known input devices.

Hover or hovering—Placing a user input device at a specific location on the graphical user interface without using a selecting feature. A "hover" action includes holding a stylus slightly above the surface of a digitizing display device, pressing arrow keys to move a cursor, or moving a mouse or trackball type user input device without holding down or clicking the button used for selection (or otherwise making a selection). Various actions can occur when a hover action takes place, for example, a display may change, information may be provided that relates to the location of the user input device during the hover, etc.

Select, selection, or selecting—Interacting with a graphical user interface and/or taking an action on a computing system using the user input device. A "selection" action includes clicking a mouse and/or trackball button, tapping and/or touching a digitizer screen with a stylus, pressing an "ENTER" or "SELECT" button, and the like. Selection typically has some type of action associated with it, such as moving a cursor, activating a function, block selecting, etc.

Current page—The specific page or portion of a page of an electronic document at which a computer system and/or application program is opened. In some examples, an active cursor will be located at the current page. During a hover operation (or at other times), a page other than the current page may be visible on all or part of the display device, although, in at least some examples, the system may return to the current page if the hover operation terminates without selecting a new page.

Viewed page or page being viewed—The specific page or portion of a page of an electronic document that appears on at least a portion of a display device, whether or not that page is the current page. In some examples, during a hover operation, the page being viewed may change, depending on the location of the user input device, without changing the current page (also called the "hover page" in this specification). Also, in some examples, if a hover operation terminates by the user selecting the page being viewed, the "current page" will change to the "page being viewed" when the selection action took place.

II. Example Hardware

The present invention may be more readily described with reference to FIGS. 1-11.

FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer readable instructions, data structures, program modules, and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB). Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as known in the art. Furthermore, although the digitizer 165 is shown apart from the monitor 107 in FIG. 1, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 1 environment shows an example environment, it will be understood that other computing environments may also be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
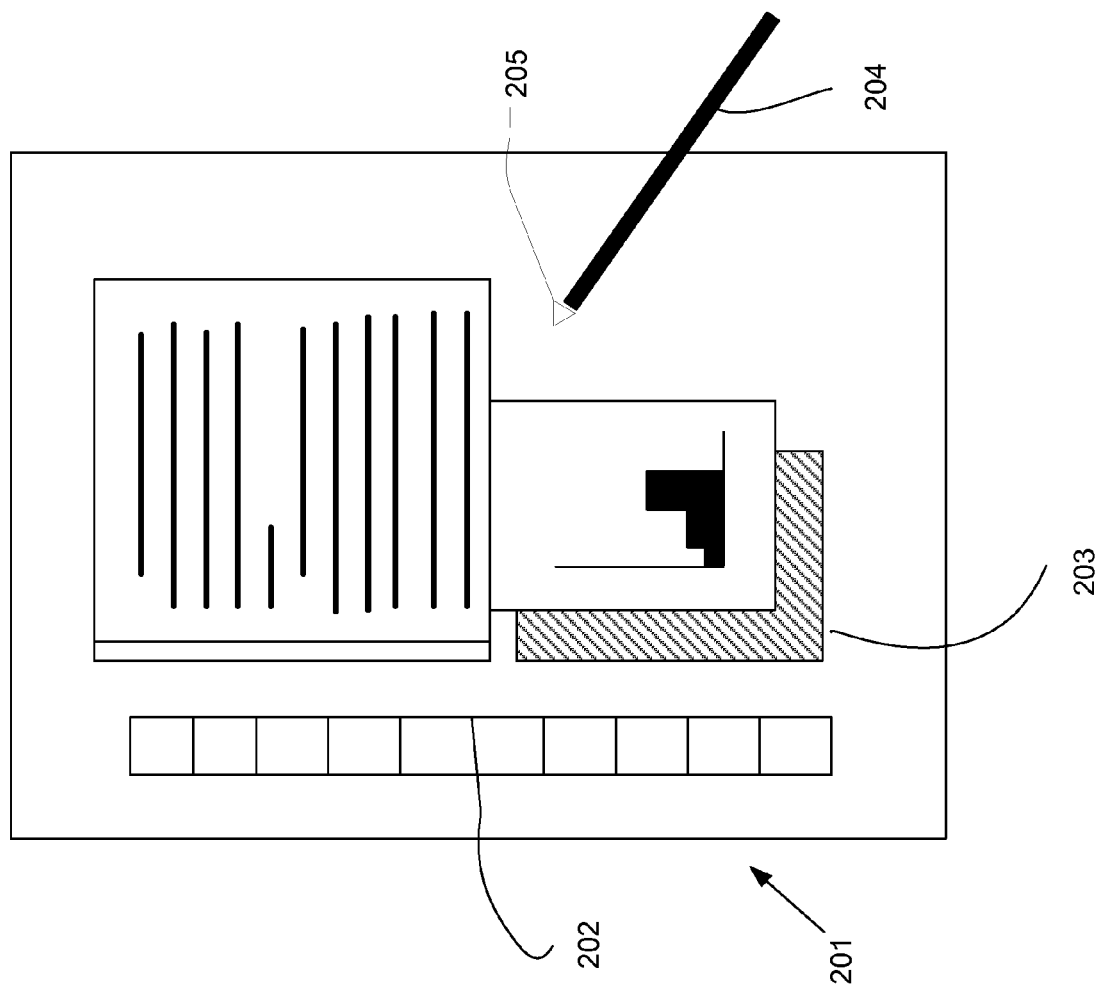
FIG. 2, which illustrates a pen-based personal computing (PC) environment in which one or more examples of the present invention may be implemented.
Figure 3:
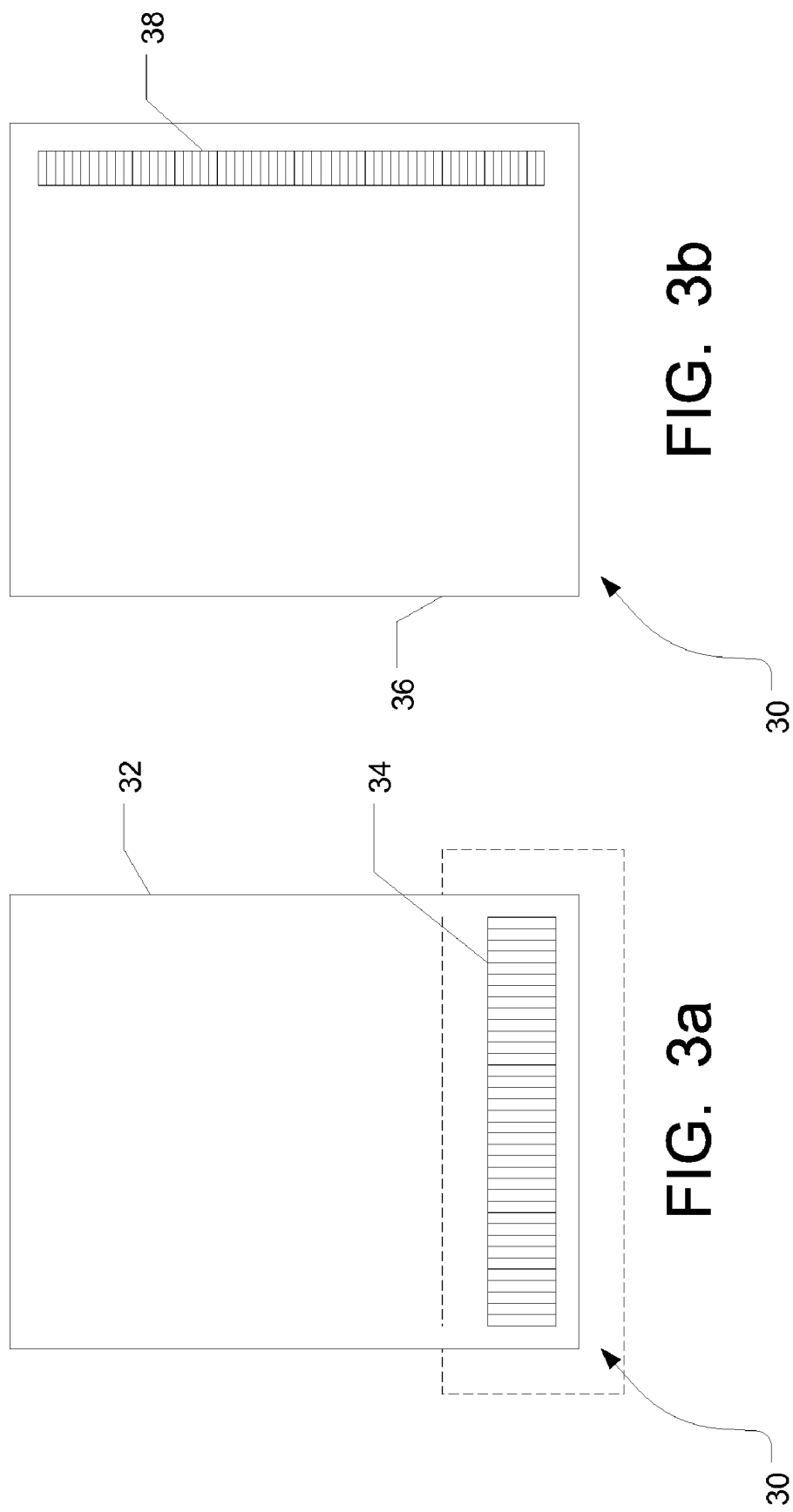
FIGS. 3a and 3b, which illustrate example locations for page bar control elements on a display device used according to this invention.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its selection capabilities. In one example, a stylus 204 could be implemented as a "pencil" or "pen", in which one end constitutes a writing portion and the other end constitutes an "eraser" end, and which, when moved across the display, indicates portions of the display that are to be erased. Other types of input devices, such as a keyboard, mouse, trackball, a finger, or the like also could be used.

In addition to a stylus-based computing system like that shown in FIG. 2, a page bar control element in accordance with some examples of the invention could be provided on a computer system embodied in a personal digital assistance, an e-book system, or any other type of computer system without departing from the invention.

III. The Page Bar Control

The invention relates to systems, methods, and computer-readable media programmed with a method for providing a page bar control element on a graphical user interface of a computer system. The page bar control element is a navigational user interface that, in some examples, quickly and effectively communicates document "thickness" and position within the "stack" to the user. The page bar control element, in some examples, also allows fast, easy, and efficient navigation through the document(s). Because a concrete sense of position and fast and efficient movement between pages (e.g., through a riffling action) have long been considered advantages of paper documents over their electronic counterparts, the page bar control elements according to some examples of the invention are important because they mimic these advantageous aspects of paper documents.

FIGS. 3a and 3b generally illustrate examples of systems 30 on which an example of a page bar control element according to the invention is being used. In the system 30 of FIG. 3a, a display device 32 is provided, which may be a computer screen, such as a PDA screen, a pen-based computing system screen, a laptop computer screen, or the like. This display device 32 displays electronic documents to a user in a conventional manner.

In accordance with this example of the invention, the graphical user interface of the system 30 also may provide a page bar control element 34. In the example of FIG. 3a, the page bar control element 34 is rendered horizontally along the bottom edge of the display 32. While various examples of page bar control elements 34 will be described in more detail below, in general, a page bar control element 34 provides a visual representation of a plurality of the pages of an electronic document.

FIG. 3b illustrates another example of a page bar control element 38 on a display device 36. In this example, the page bar control element 38 is rendered vertically, along the right edge of the display 36. Those skilled in the art will recognize, of course, that a page bar control element could be rendered at any location on a computing system display device without departing from the invention. Additionally, in some examples of the invention, the user may selectively control the page bar control element location. Accordingly, while the specific examples illustrated in FIGS. 4-9c show the page bar control element at the bottom of the display device, in the area shown in broken lines in FIG. 3a, this location is merely an example of one suitable location and does not limit the invention.

FIG. 4 illustrates an example of a page bar control element 40 as it might be rendered for a multi-page electronic document 42 opened and displayed on a display device 44. As illustrated, this example page bar control element 40 includes a visual representation of each page of the twelve page electronic document, and the optional page counter 46 at the right-hand side of the display device 44 displays the current page (page 5) and the total number of pages in the document (12 total pages). In this specific example, the page bar control element 40 includes a plurality of tabs or markers 48, wherein one separate marker 48 corresponds to each page of the electronic document. The display control elements 400 illustrated at the right-hand side of FIG. 4 may or may not be present in any given example of a graphical user interface. In this example, these control elements 400 correspond to conventional control elements present in a graphical user interface including a scroll bar down arrow button, a page up arrow button, and a page down arrow button.

The marker 50 on the page bar control element 40 visually identifies the current page of the electronic document. Notably, the marker 50 for the current page in this example is rendered in a background color and/or pattern that match the background color and/or pattern of the electronic document page 42, and with the actual page number displayed in the marker 50 (page 5, in this example). Of course, other information, such as document title, total page count, or the like may be rendered in or near marker 50 without departing from the invention. The other markers 48 (for non-current pages) may be rendered in a different color and/or pattern to help distinguish the non-current pages from the current page on the page bar control element 40. Thus, the background for non-current markers 48 is illustrated by hatched lines in FIG. 4. Of course, other ways of distinguishing the current page from non-current pages also are possible without departing from the invention (e.g., slightly raising or lowering the current page marker with respect to non-current page markers, outlining the current page marker, etc.). Also, if desired, additional information may be rendered in the non-current markers 48, such as the page number, etc.

When using the page bar control element 40, the user can quickly navigate from page to page in the electronic document, by selecting a marker 48 corresponding to a non-current page. When the user selects a non-current page marker 48 (e.g., by clicking on the marker 48 using a mouse input device or by tapping on the marker 48 on the display device 44 with a stylus in a pen-based computing system), the display changes to illustrate the newly selected page as the current page. Likewise, the page bar control element 40 also would change, for example, by changing the marker at the newly selected page to the background color and/or pattern of a current page marker 50, by changing the marker at the previous current page to the background color and/or pattern of a non-current page type marker 48, and by changing the page counter 46 to reflect the newly selected current page.

FIG. 5 illustrates additional features of a page bar control element according to some examples of the invention. In this instance, the page bar control element 52 corresponds to an electronic document having 42 total pages. To assist in easily identifying the current page, the marker 54 corresponding to the current page (page 14 in this example) is shown wider than the other markers 56, and it also includes the current page number in it. Additionally, the marker 54 corresponding to the current page also has the same background pattern and/or color as the current page, while the other markers 56 have a different background pattern and/or color.

An additional feature available in some examples of the page bar control element according to the invention is illustrated in FIG. 5. To assist a user in locating a desired page in an electronic document, some examples of the invention are equipped with a "riffle" feature. As illustrated in FIG. 5, as a user hovers an input device 58 (such as a stylus) over the page bar control element 52 (in the illustrated example, over page 9), the marker 60 corresponding to the hover location of the input device 58 changes, for example, to show the page number and, if necessary and/or desired, the marker 60 corresponding to the hover location also may be enlarged. Optionally, if necessary and/or desired, the marker 54 for the current page may be shrunk to the width of the other markers 56, to maintain the same overall number of markers and marker width on the page bar control element 52. In this event, the page number also may be deleted from the current page marker 54, if necessary, and its color also may be changed, if desired.

While this hovering action takes place, the page (or a portion thereof) rendered on the screen of the display device may change to show all or some of the page located at the hover location. In the illustrated example, as the input device 58 remains hovered at the page 9 marker 60, the display device content may change to illustrate some or all of the content of page 9 of the electronic document. Additionally, as the user moves the hovering input device 58 across the page bar control element 52 from marker 56 to marker 56, different pages (or portions thereof) will be rendered on the display device corresponding to the current location of the hovering input device 58 on the page bar control element 52 (the page bar control element 52 also may change to enlarge the marker corresponding to the new hover page and to provide the page number for this new hover page location). In this manner, a user can quickly page through a multi-page electronic document (akin to "riffling through" a paper document), for example, when looking for a particular portion or page of the document, without losing his or her current location in the document.

In some examples of this aspect of the invention, the display content will correspond to the page of the hover location only while the input device 58 remains in a hover position over the page bar control element (and, optionally, for a short time after the hover action terminates). If the user selects the page of the hover location (e.g., by tapping the screen with the input device 58 or by clicking a button on a mouse or stylus), the current page will change to the newly selected page (and the page bar control element also will change to reflect the newly selected page). If the user removes the input device 58 from a hover location without making a selection (e.g., by moving the stylus away from the screen or the page bar control element), then the display content in this example of the invention will automatically change back to the previously designated current page.

If desired, in some examples of the invention, when the user is using the riffling technique described above, the background pattern and/or color of the page bar control element 52 may be changed to illustrate the markers 64 where a hover action has occurred different from the markers 56 where no hover action has occurred. In the example illustrated in FIG. 5, the user began hovering the user input device at the marker for page 5 and riffled forward through the marker 60 for page 9 (i.e., pages 5-9 of the electronic document have been subjected to the hover-type "riffling" action). Accordingly, the background pattern and/or color of these riffled markers 64 have been changed (shown as cross-hatching in FIG. 5) to quickly show the user which pages have been looked at during this hover action. The change in appearance of the page bar control element 52 to illustrate the riffled pages may be maintained by the systems and methods according to this aspect of the invention for any desired time period without departing from the invention, for example, until the current hover activity terminates, until a new current page is selected, until reset by the user, and/or at any other time. Also, a user can riffle in either direction (lower page to higher page or higher page to lower page) without departing from the invention.

For long documents, there may not be sufficient room to display a marker on the page bar control element for each and every page. To enable accurate selection and hovering, each marker should have some minimal width (e.g., four digitizer pixels wide, 1/16 inch, 1 mm wide, etc. at a minimum). Accordingly, a page bar control element can display a maximum number of pages depending, for example, on screen size, screen resolution, etc. If an electronic document contains more pages than displayable in the page bar control element, some accommodation is needed.

FIGS. 6a and 6b illustrate examples of systems and methods including page bar control elements that handle electronic documents with more pages than can be individually illustrated by tabs or markers on a page bar control element. As illustrated in FIG. 6a, the overall electronic document contains 212 pages, many more than can be displayed with individual markers 72 on the illustrated page bar control element 70. In this example, the page bar control element 70 contains individual markers 72 for pages 47-69, and a front-end marker 74 for earlier pages 1-46 and back-end marker 76 for later pages 70-212. The user can navigate to other pages not individually visible in the page bar markers 72, e.g., by selecting and/or hovering over one of the end markers 74 or 76, which shifts the individually marked pages to the left or right (front or back) by any desired amount. For example, by selecting or hovering on the front-end marker 74, the individually marked pages could make a complete shift so that the first page with an individual marker (page 47 in this case) becomes the first page located at the back-end marker 76. Alternatively, selecting or hovering over the front-end marker 74 could shift the individually marked pages some number less than a complete shift (e.g., by ten pages, fifteen pages, or some other number of pages), so that some of the originally individually marked pages would also be individually marked when the shift is made. Also, selecting front-end marker 74 could produce a different action than hovering over that marker 74 (e.g., selecting front-end marker 74 could produce one complete shift of the page bar whereas hovering over the front-end marker 74 could shift ten pages (or some other number of pages)). Of course, the page bar control element 70 also could include buttons or the like, or support other actions (such as a double click), to allow rapid transfer to the first and/or last pages of the document without departing from the invention.

FIG. 6a illustrates other optional features that may be used in some examples of the invention. For example, in FIG. 6a, the marker for the current page (marker 78) and the markers for the immediately surrounding pages (markers 80 and 82) are rendered somewhat larger than the other markers 72. In this manner, a user can easily select and/or hover over markers for pages that immediately surround the current page. While the example illustrated in FIG. 6a shows three enlarged markers 80 and 82 on each side surrounding the current marker 78, of course any number of markers can be enlarged without departing from the invention.

The feature of expanding surrounding markers also can be used during a hover action in some examples of the invention, as further illustrated in FIG. 6b. As shown in this figure (using reference numbers corresponding to the reference numbers in FIG. 6a, where appropriate), the page bar control element 70 includes the individual page bar markers 72, the front-end marker 74, and the back-end marker 76. In this instance, the current page marker 78 is located at page 68, and a user input device 84 is shown hovering over the marker 86 for page 58. In this instance, the markers 88 for two pages immediately preceding the hover page marker 86 and the markers 90 for two pages immediately after the hover page marker 86 are shown enlarged to allow easy navigation to these additional nearby pages. Of course, any number of surrounding page markers could be shown enlarged without departing from the invention. Also, although not illustrated in FIG. 6b, markers surrounding the current page marker 78 also could be shown enlarged (like in FIG. 6a), without departing from the invention.

If desired, it is not necessary that each enlarged marker 80, 82, 88, and 90 be of the same size. Variations in size are possible without departing from the invention. For example, markers located closest to the current page marker 78 and/or the hover page marker 86 may appear somewhat larger than the next closest markers, which may appear larger than the next closest markers, etc., until the marker size reaches the minimum marker size.

Figure 7A:
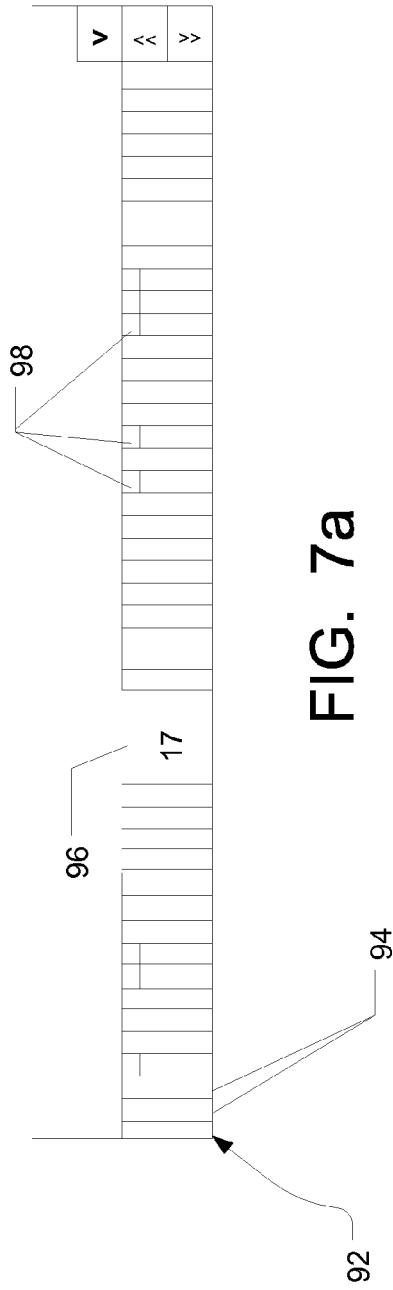

FIG. 7a illustrates additional features available in some examples of the invention. As illustrated in FIG. 7a, a page bar control element 92 includes multiple markers 94, with the marker 96 for the current page (page 17 in this instance), shown enlarged. Several page markers 94 include flag elements 98, which make all or some of the marker 94 appear different, e.g., with a different background color, background pattern, etc. In some examples of this aspect of the invention, flag elements 98 can be placed on page markers 94 by the user and used for any purpose desired by the user, e.g., to flag important portions of a document, to flag areas that need additional work or research, etc. Additionally, flag elements 98 could appear in a document automatically (placed in the document automatically by the system), for example, to illustrate the location of search terms after a "search" or "find" operation, to illustrate the location of errors found by a spelling or grammar checking routine, etc. Of course, user produced flag elements may appear different from automatic system placed flag elements (e.g., different color, different style) without departing from the invention.

Figure 7B:
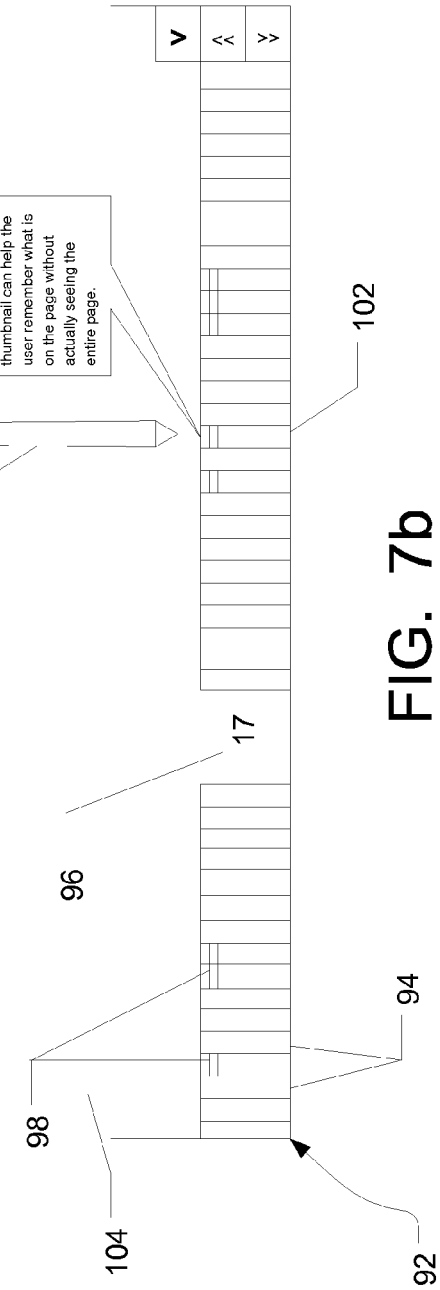

FIG. 7b illustrates an example of a page bar control element 92 including flag elements 98 on various markers 94, like that shown in FIG. 7a, during a hover operation. During hover, a user hovers an input device 100 over a page marker 102 other than the marker 96 for the current page. As noted above, during a hover operation, the display area 104 may change to illustrate some or all of the page represented by the marker 102 at the hover location during the hover operation. This is not a requirement, however, in all examples of the invention. As illustrated in FIG. 7b, in some examples of the invention, during a hover operation, a thumbnail rendering 106 of the entire page (or a portion thereof) at the hover location may appear, for example, overlaying a portion of the current page displayed in the display area 104. In this manner, the user can view a small version 106 of the page at the hover location while still seeing at least much of the information contained on the current page. The hover rendering 106 may automatically disappear when or a predetermined time after the hover operation ceases (if no selection is made). Those skilled in the art are familiar with the concept of providing thumbnail renderings like rendering 106 depicted in FIG. 7b.

If desired, when the hover operation occurs at a page marker including a flag element 98, the rendering of the hover page, even when present as a thumbnail rendering 106, may illustrate the highlighted portion. As illustrated in the example of FIG. 7b, the thumbnail rendering 106 includes underlining to show the reason for the flag element 98 on the marker 102. Rather than using underlining, any suitable manner of highlighting the flagged portion can be used without departing from the invention. For example, the flagged portion of the document can be shown in a different color (such as a highlighted color), in italics, bolded, etc., without departing from the invention.

Figure 8A:
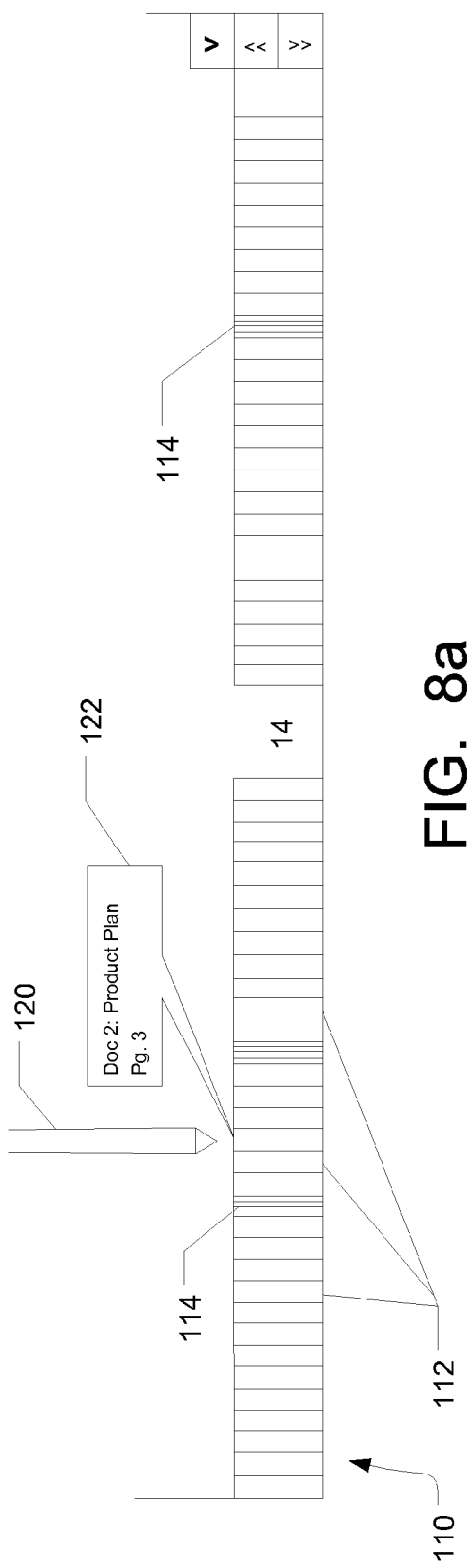

The page bar control element according to at least some examples of the invention is not limited to representing pages of a single document. For example, as illustrated in FIG. 8a, a page bar control element 110 may include markers 112 representing a plurality of open electronic documents. The page markers 112 for the different documents may be separated on the page bar control element 110 with a special marker 114, which may be, for example, a marker with a different appearance (different color, different background pattern, different size, etc.). The special marker 114 may actually also function as a page marker (e.g., representing the first or last page of a document), or it may simply represent a break point between consecutive electronic documents open on the computing system. In the example illustrated in FIG. 8*a*, special markers 114 represent the first page of a new document.

Of course, the use of special markers 114 is not required for distinguishing one document from another. Other manners of making this distinction are possible. For example, the markers 112 for one document might appear in a different background color and/or background pattern than the markers 112 for the adjacent document(s). Other distinctions also are possible without departing from the invention.

As illustrated in FIG. 8*a*, in some examples including these features of the invention, when a user hovers an input device 120 over a marker 112 for a non-current page, information appears regarding that page. In the illustrated example, the information about the hover page appears as an information balloon 122 that includes the title and page of the document over which the user input device 120 is currently hovering. As the user moves the input device 120 over the page bar control element 110 while hovering, the information in the information balloon 122 will change to present information relating to the page at the current hover location. This can be seen, for example, by comparing the information balloons 122 in FIGS. 8*a* and 8*b*. If desired, during the hover action, the display of the computer system may temporarily illustrate all or part of the page at the hover location and/or a thumbnail rendering of the page at the hover location.

As described above in connection with FIGS. 6*a* and 6*b*, when the number of pages in an open document or documents exceeds the number that can be displayed on a single page bar control element, the additional pages may be accessed, for example by providing a front-end page marker 74 and a back-end page marker 76. Other ways of enabling access to these additional pages can be providing without departing from the invention. For example, rather than (or in addition to) end page markers 74 and 76, a scroll bar could be provided the spans the entire length of the document(s) and enables a user to pinpoint the location where the page bar control element should be located.

Additional examples are shown in FIGS. 9*a* through 9*c*. In these figures, a page bar control element 130 is provided that provides markers 132 representing the pages of one or more documents (four documents are open in the specific example illustrated in FIGS. 9*a* through 9*c*, but this is merely an example). Each marker 132 may represent one or more pages of the document in which it resides. This may be illustrated, for example, when a user input device 134 hovers over an individual page marker 132 in document 2, an information balloon 136 appears that contains the document title and the different pages 138 (also called a "multi-page bar") represented by this specific page marker 132. In the illustrated example, each marker 132 of document 2 represents four pages. Therefore, the fourth marker 132 in this document (over which the user input device 134 is currently hovering) represents pages 13-16 in the document. After the information balloon 136 appears including identification of the specific pages 138 represented by the marker, the user may move the input device 134 to hover over and/or select any one of these specific pages to therefore temporarily display the information on the page (e.g., in a thumbnail rendering or on the main portion of the display device) and/or to change the current page to that page.

FIG. 9*b* illustrates the same page bar control element 130 of FIG. 9*a*, but the user input device 134 is now hovering over a different page marker 132 (specifically, the first page marker of document 4, which represents six pages in this example). Thus, as illustrated by this example, the page markers 132 in one document need not represent the same number of pages as represented by a page marker 132 in a different document.

In FIGS. 9*a* and 9*b*, because all pages of document 3 include a separate marker 132, the page marker 140 for the current page (page 14 of document 3, in this instance) represents a single page. This is just an example. If the document containing the current page is long enough such that each page marker 132 represents more than one page, the current page marker 140 may always appear as a single page, as shown in FIGS. 9*a* and 9*b*, while the other markers 132 of that document may represent one or more pages. Alternatively, if the document containing the current page is long enough such that each marker 132 represents plural pages, the current page marker 150 also may represent plural pages, as illustrated in FIG. 9*c*. In that instance, a multi-page bar 152 may appear, similar to the multi-page bar 138 in FIGS. 9*a* and 9*b*, as part of the current page marker 150. This multi-page bar 152 may include an additional indication (e.g., different background colors or patterns) to indicate the current page 154 on the multi-page bar 152. In the illustrated example of FIG. 9*c*, the current page 44 of the current page bar marker 152 is shown without a bounding box, while the non-current pages 156 represented by that same marker 152 (pages 43 and 45 in the illustrated example) are shown within a bounding box. Other suitable ways of handling this situation and illustrating the current page also are possible without departing from the invention.

Figure 8B:
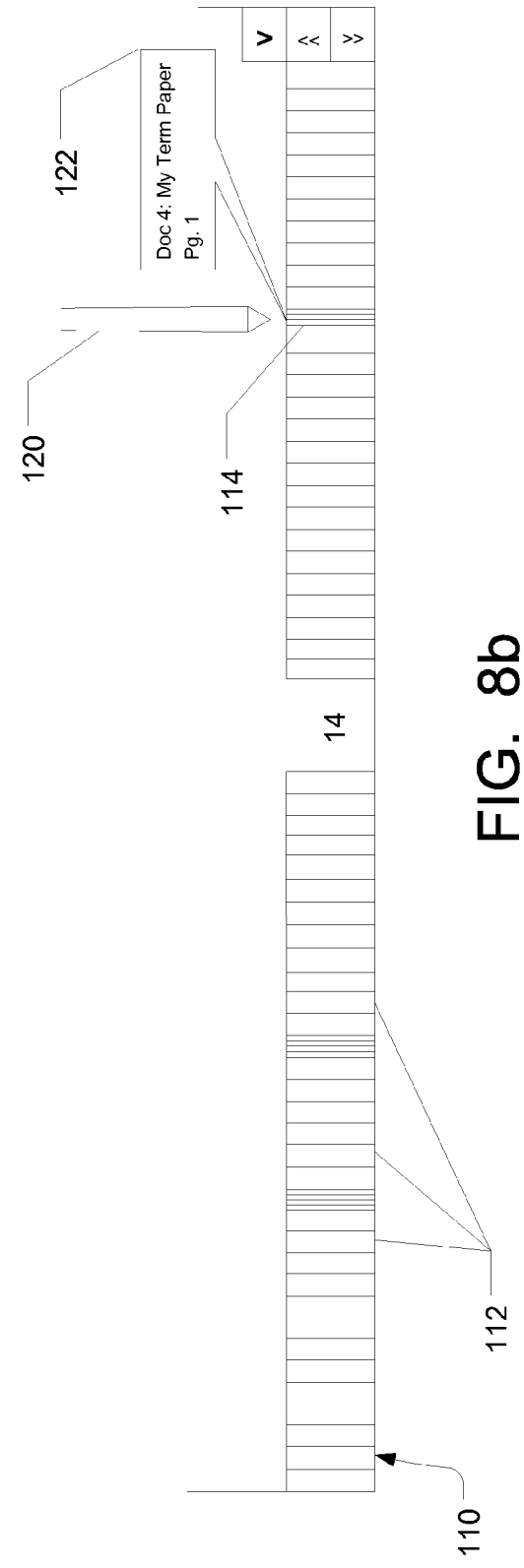

Of course, while the page bar control elements 110 and 130 of FIGS. 8*a*, 8*b*, 9*a*, 9*b*, and 9*c* illustrate different documents open, this is not a requirement. For example, one long document could be open and the special markers 114 (as shown in FIGS. 8*a* and 8*b*) could be used to identify different sections of this long document (e.g., individual chapters in an e-book). As another example, one long document may be opened and still require multiple pages per displayed page bar marker 132, as illustrated in FIGS. 9*a* through 9*c*. Uses of the page bar control elements, page markers, and special page markers in these manners fall within the scope of some examples of this invention.

As another example, when an individual page marker represents plural pages, the location of the hover action on the marker may be used to specifically identify the page being viewed. For example, for page markers representing three pages, hovering over the top third (or left third) of the marker may cause the first page to be viewed, hovering over the middle third of the marker may cause the second page to be viewed, and hovering over the bottom third (or right third) of the marker may cause the third page to be viewed.

In some examples of the invention, the page bar control element will span essentially the entire dimension of the display device at which it is located (e.g., essentially the entire width or length of the display or window in which it is in use, as illustrated in FIGS. 3*a* and 3*b*). While the markers may be in any shape, in the illustrated examples, the markers have a generally rectangular shape.

Additionally, the different open documents represented in the page bar control element may be documents corresponding to different application programs. For example, one document on the page bar control element may represent a document from a word processing application, while another document on the page bar control element may represent a document in a spreadsheet application, etc.

As another option, systems and methods according to some examples of the invention may allow a user to set and/or change the order of documents represented on a page bar control element. For example, a user could reorder the documents represented on the page bar alphabetically by title, or sort them in any other suitable or desired manner. As examples, a hover operation may be used to display to the user a complete list of displayed documents on the page bar control element and/or the manner in which the displayed documents presently are sorted and/or a list of available sort orders. Also, as additional examples, a tap or select operation can be used to allow the user to see different available document sets and/or different sort orders from which to choose and/or to produce a sorting action.

While the width of individual markers in the page bar control element may be readily determined in any suitable manner, an example procedure follows, which is illustrated in flow chart of FIG. 10. As the procedure starts (Step S1000), the total number of pages in the open document(s) (value "N") is determined (Step S1002), and the total available page bar control element width (value "Y") is determined (Step S1004). As described above, the system also will have a minimum current page marker width (value "X;" Step S1006)) and a minimum non-current page marker width (value "Z;" Step S1008). As one example, the minimum current page marker width X may be set to a minimum width of 4 mm plus the additional room required to display all characters in the largest page number present in the open document(s) (as illustrated in various figures above, the current page marker in some examples of the invention is shown larger than the non-current page markers, and it also may include the page number rendered within the marker space). As another example, the minimum non-current page marker width Z may be set to 1 mm. Alternatively, these minimum widths and other dimensions may be determined based on digitizer pixel units or in any other suitable manner.

An interim non-current page marker width is then calculated based on the assumption that each open page will have its own, individual marker. As described above, in some examples of the page bar control element, the current page marker will have a larger size than the other markers in the page bar control element. Because the current page marker must have a minimum width of X and the total width of the page bar is Y, the remaining, non-current page markers can take up a total width of Y−X. Accordingly, if all open pages were to have their own individual marker, each individual non-current page bar marker width may be calculated as (Y−X)/(N−1) (Step S1010).

The system then determines whether this interim non-current page marker width is wider than the minimum current marker width X (Step S1012). If YES, this means that the open document(s) on the system contain a relatively small number of pages, such that each page marker may be at least as wide as the minimum current page marker width X. In this situation, the system according to this example of the invention evenly divides the page bar control element width among all the pages, i.e., the current page marker width and the non-current page marker width are calculated as Y/N (Step S1014). Of course, if desired, the various page marker widths could be divided up (equally or non-equally) in any other manner without departing from the invention. The procedure then ends (Step S1016).

If the system determines at Step S1012 that the interim non-current marker width from Step S1010 is smaller than the minimum current marker width X (answer NO), the system then determines whether the interim non-current marker width is less than the minimum non-current marker width Z (Step S1018). If NO, the current marker width is set equal to X (Step S1020) and the non-current marker width is set equal to the interim non-current marker width ((Y−X)/(N−1)) (Step S1022). The procedure then ends (Step S1016). As a result of this procedure, every open page will have its own separate marker.

If, at Step S1018, the system determines that the interim non-current marker width is less than the minimum non-current marker width Z, the system sets the current marker width equal to X (Step S1024) and the non-current marker width equal to Z (Step S1026). Non-current pages surrounding the current open page will fill the non-current markers, and the system will accommodate the additional pages in the markers (Step S1028), e.g., by providing back-end and front-end markers as illustrated in FIGS. 6a and 6b, by assigning multiple pages to at least some of the markers as illustrated in FIGS. 9a through 9c, by providing a scroll bar, or in some other appropriate manner. The procedure will then end (Step S1016).

Those skilled in the art will recognize that this procedure for determining marker width is merely illustrative and can be readily changed without departing from the invention, e.g., by changing the order of steps, by using different calculations, by using different minimum and/or maximum values, etc. Also, the procedure can be readily adapted to accommodate enlarged markers around the current page and/or enlarged markers corresponding to the hover page and/or additional pages surrounding the hover page (as illustrated in FIGS. 6a and 6b). Also, as other alternatives, if desired, the current marker and the non-current marker(s) can be made to constant sizes and/or maximum sizes and/or the overall page bar control element width can be adjusted, for example, in the event that a small number of pages are open on the system.

Figure 11:
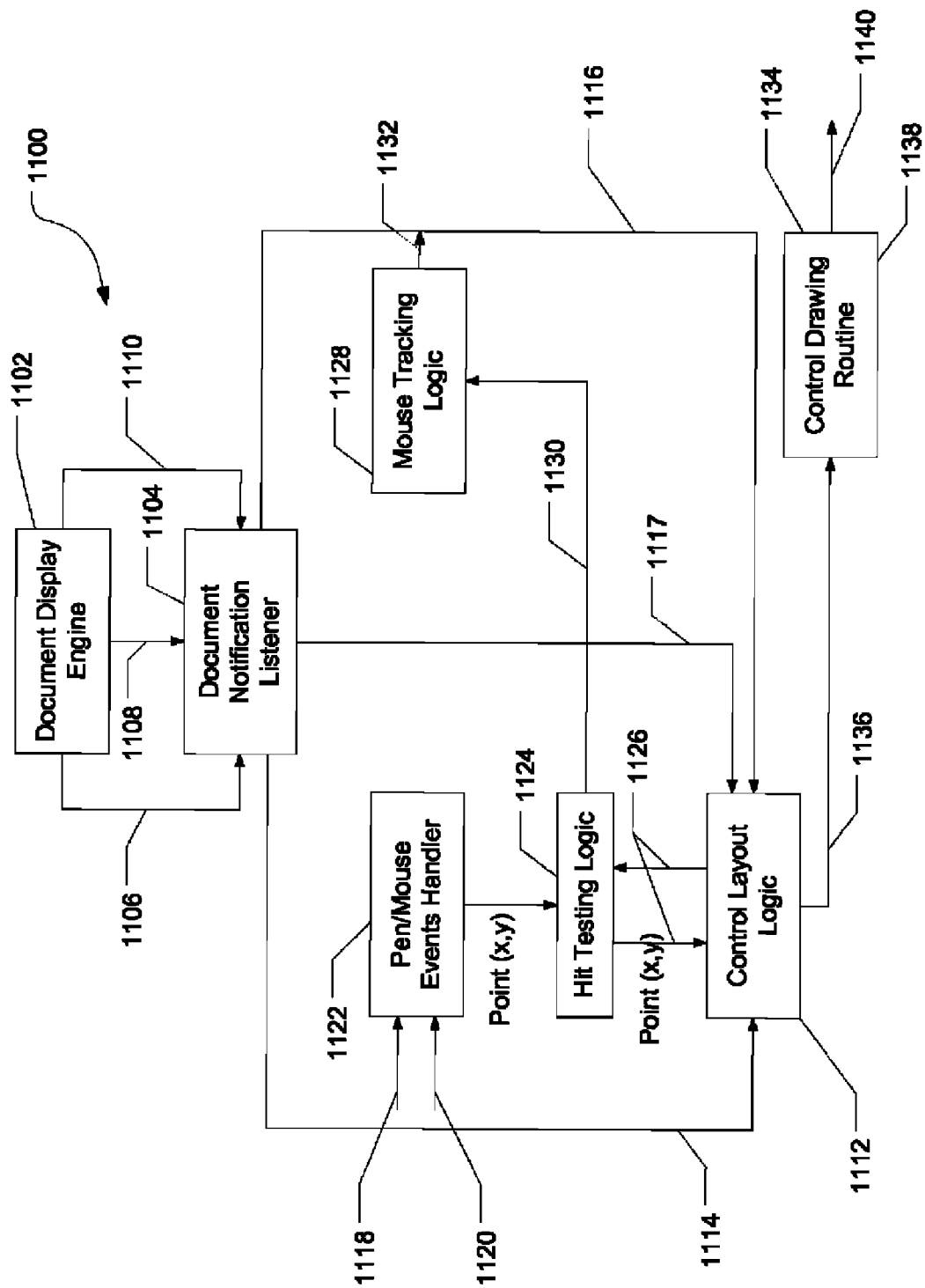
FIG. 11 illustrates an example of a system for rendering a page bar control element in accordance with this invention.

FIG. 11 illustrates an example of a system 1100 useful for generating and maintaining a page bar control element on a display device of a computing system according to this invention. The system 1100 includes a document display engine 1102 that is responsible for layout and drawing the various document views on the computing system display device. A "document notification listener" 1104 monitors the computing system and the open electronic document(s) for changes. For example, the document notification listener 1104 notes changes in the overall page count of the open electronic document(s) (signal along line 1106), changes in the flags set on the page bar control element (flags set or removed; signal on line 1108), and changes in the identification of the current page (signal on line 1110).

The document notification listener 1104 sends signals to the page bar control layout logic element 1112 based on the changes noted in the open electronic document(s). For example, the document notification listener 1104 sends signals to the page bar control logic layout element 1112 along line 1114 to enable updates of the various marker widths (e.g., the widths of the current marker and the non-current markers). Also, the document notification listener 1104 sends signals to the page bar control logic layout element 1112 along line 1116 to update the current page identification. Additionally, the document notification listener 1104 sends signals to the page bar control logic layout element 1112 along line 1117 to add a flag to or subtract a flag from one or more of the page markers on the page bar control element. The page bar control layout logic element 1112 is responsible for appearance and placement of the various elements of the page bar control element on the display device.

User input (e.g., stylus or mouse drag or hover events 1118, stylus tap or mouse button click events 1120, etc.) is received by the system at a pen/mouse events handler 1122. The display device location of the user interaction (e.g., the (x, y) coordinates on the digitizer display) are passed along to a hit testing logic device 1124, which determines the necessary and/or desired changes and/or actions based on the user's input (e.g., based on the location of the user input). The hit testing logic device 1124 is in communication with the page bar control logic layout element 1112 (lines 1126).

When the user selects a new current page (e.g., by tapping or clicking on an element of the page bar control), the hit testing logic device 1124 sends a signal to a mouse tracking logic device 1128 along line 1130 indicating the page number of the newly selected page. The mouse tracking logic device 1128 sends this information to the page bar control layout logic element 1112 (e.g., along lines 1132 and 1116), which is responsible for updating the current page marker on the displayed page bar control element.

Information regarding new page bar control element positions and dimensions is sent from the page bar control layout logic element 1112 to a page bar control element drawing routine or system 1134 (via line 1136), which is responsible for drawing the page bar control element on the display device or sending the appropriate signals 1140 to have the correct page bar control element drawn.

Of course, the above-described system is merely an example, and many changes and modifications thereto can be made without departing from the invention. For example, while individual signal lines are shown in FIG. 11, this is for purposes of clarity. One or more of the signals described above may propagate along a single line without departing from the invention. Also, the various logic devices and elements are shown separate in FIG. 11 for clarity. These functions (or other suitable functions) can be performed by a single processor programmed to perform the various functions. Also, other suitable systems and methods for drawing a page bar control element can be used without departing from this invention.

IV. Conclusion

Various examples of the present invention have been described above, and it will be understood by those of ordinary skill that the present invention includes within its scope all combinations and subcombinations of the various features of the invention described in these examples. Additionally, those skilled in the art will recognize that the above examples simply exemplify the invention. Various changes and modifications may be made without departing from the spirit and scope of the invention, as defined in the appended claims.

The invention claimed is:

1. A system comprising:
 a display device configured to display at least a portion of a current page of a document that includes multiple pages; and
 a processor configured to render a page bar control element that provides a visual representation of a plurality of pages of the document,
 wherein the visual representation includes a plurality of markers, each marker representing one or more pages of the document,
 wherein a background of a marker corresponding to the current page corresponds to a background of the current page on the display device,
 wherein backgrounds of markers not corresponding to the current page differ from the background of the current page and backgrounds of each of the markers not corresponding to the current page are the same,
 wherein upon receipt of a preview request on the page bar control element, at least a portion of a non-current page can be instantly previewed on the display device at the same time the current page is displayed without receiving user selection of the non-current page,
 and wherein if the system does not detect selection of the non-current page prior to termination of the preview request, the preview of the non-current page is removed from the display,
 and wherein a marker associated with the non-current page that was previewed is automatically changed to a background that is the same as at least one other marker corresponding to another non-current page that has been previewed.

2. A computer-readable storage medium including computer-executable steps for performing a method comprising:
 rendering a content display including at least a portion of a current page of a document that includes multiple pages;
 rendering a page bar control element that provides a visual representation of a plurality of pages of the document, wherein the visual representation includes a plurality of markers, each marker representing one or more pages of the document;
 rendering at least a portion of a new page of the document upon receiving user input through the page bar control element indicating a desire to preview the new page, wherein the user input includes an indication that the user is hovering a user input device proximate a marker of the page bar control element corresponding to the new page without selecting the new page;
 upon receiving the user input, simultaneously displaying the current page and at least a portion of the new page on the content display;
 upon identifying that the user input device is no longer hovering proximate the marker corresponding to the new page, automatically returning the content display to the current page; and
 rendering the page bar control element such that the marker corresponding to the non-current page being previewed is as large as the marker corresponding to the current page while being previewed and is automatically reduced to a size smaller than the marker corresponding to the current page upon identifying that the user input device is no longer hovering proximate the marker corresponding to the non-current page.

3. The computer-readable storage medium according to claim 2, wherein the method further comprises:
 changing the current page to the new page upon receiving a user selection of the new page.

4. The computer-readable storage medium according to claim 2, wherein the method further comprises:
 determining that the user input device has moved to a different marker of the page bar control element; and
 changing the rendered new page portion to correspond to page represented by the different marker.

5. The computer-readable storage medium according to claim 2, wherein the rendering of at least a portion of the new page includes rendering a thumbnail view of the new page while the current page remains at least partially displayed.

6. The computer-readable storage medium according to claim 2, wherein the rendering of at least a portion of the new page at least partially replaces the rendering of the current page.

7. A computer-readable storage medium including computer-executable instructions for performing a method comprising:
- rendering a content display including at least a portion of a current page of a document that includes a plurality of pages;
- rendering a page bar control element that provides a visual representation of the plurality of pages of the document, wherein the visual representation includes a plurality of markers, each marker representing one or more pages of the document;
- providing a flag on each marker that corresponds to a page on which a user has set a flag or on which a flag has automatically been set, wherein the flag provides that the marker that corresponds to a page on which a user has set a flag appears with a different background than markers that do not correspond to a page on which a user has set a flag,
- and wherein the marker that corresponds to the page on which the user has set the flag appears with the same background as at least one other marker corresponding to a another page on which the user has set a flag;
- upon receipt of a preview request, instantly displaying a preview of at least a portion of a non-current page at the same time the current page is displayed without receiving user selection of the non-current page; and
- removing the preview of the non-current page if no user selection of the non-current page is detected prior to termination of the preview request.

8. The computer-readable storage medium according to claim 7, wherein the method further comprises rendering at least a portion of a new page of the document upon receiving a user input through the page bar control element indicating a desire to preview the new page, and wherein the user input indicating the desire to preview the new page includes an indication that the user is hovering a user input device proximate a marker of the page bar control element corresponding to the new page.

9. The computer-readable storage medium according to claim 8, wherein the method further comprises:
- detecting, movement of the user input device proximate to a different marker of the page bar control element; and
- changing the rendered new page portion to correspond to a page corresponding to the different marker proximate to which the user input device is located.

10. The computer-readable storage medium according to claim 8, wherein the rendering of at least a portion of the new page includes rendering a thumbnail view of the new page while the current page remains at least partially displayed.

11. The computer-readable storage medium according to claim 8, wherein the rendering of at least a portion of the new page at least partially replaces the rendering of the current page.

12. The computer-readable storage medium according to claim 7, further comprising:
- displaying the preview of the at least a portion of the non-current page on a touch-sensitive display device.

13. The computer-readable storage medium according to claim 7, wherein the touch-sensitive display device receives user selections from a touch input of a user input device.

14. The system according to claim 1, wherein the display is a touch-sensitive display device that receives user selections from a touch input of a user input device.

15. The system according to claim 2, wherein the display is a touch-sensitive display device that receives user selections from a touch input of a user input device.

* * * * *